April 25, 1944.    J. G. DORWARD, JR    2,347,472
AIR VOLUME CONTROL FOR FLUID PRESSURE TANKS
Filed Nov. 16, 1940    4 Sheets-Sheet 1
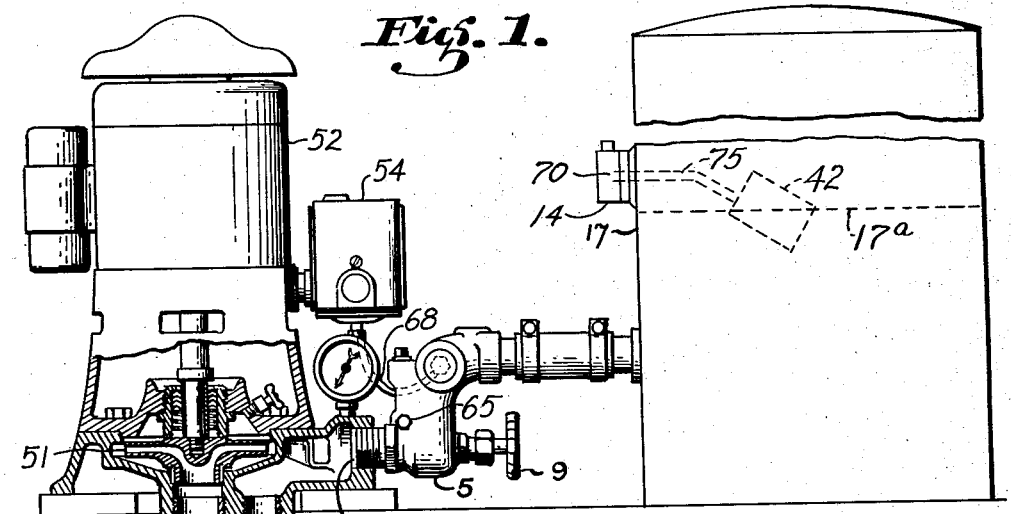
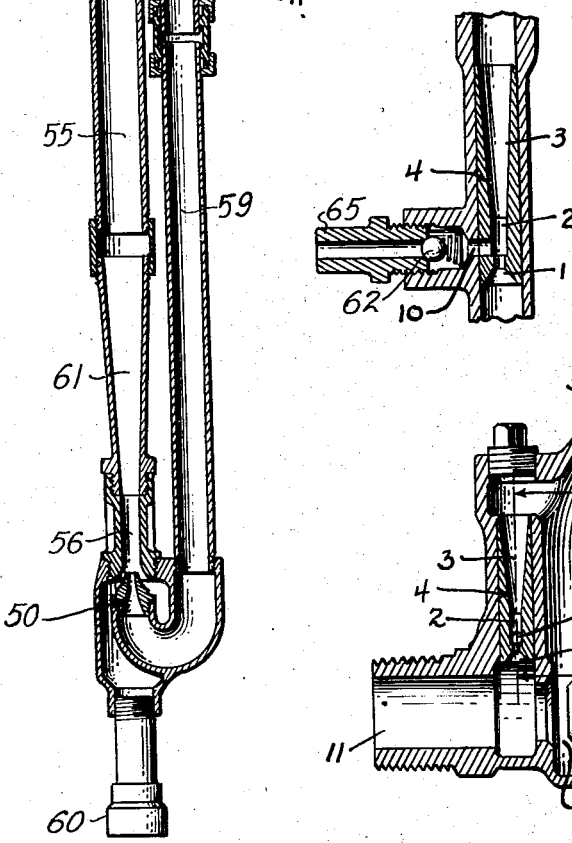
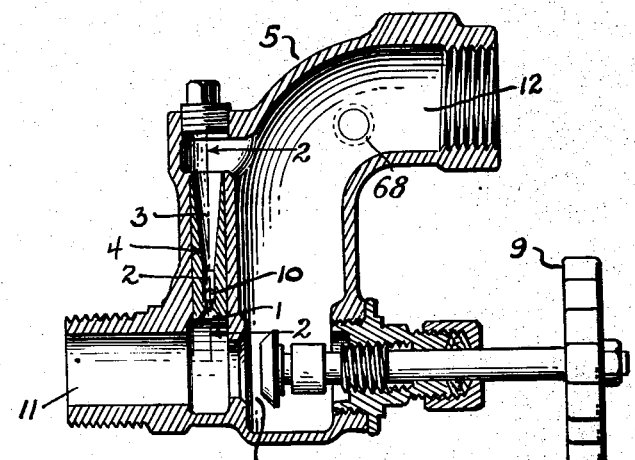
INVENTOR.
John G. Dorward, Jr.
BY Chas. E. Townsend
ATTORNEY April 25, 1944. J. G. DORWARD, JR 2,347,472
AIR VOLUME CONTROL FOR FLUID PRESSURE TANKS
Filed Nov. 16, 1940 4 Sheets-Sheet 2
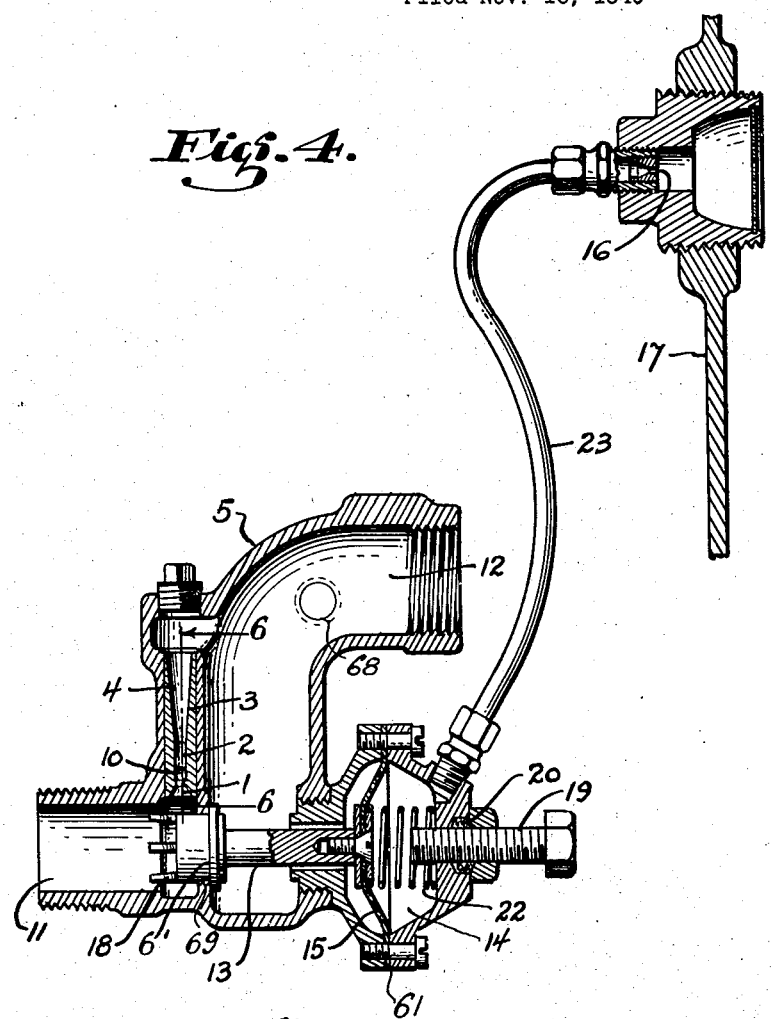
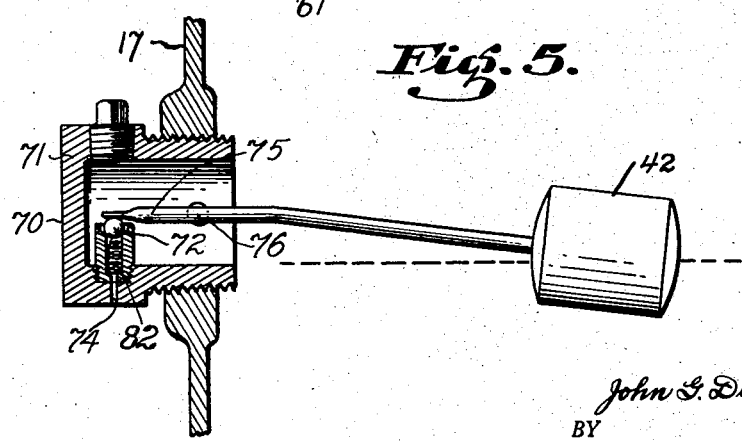
INVENTOR.
John G. Dorward, Jr.
BY
Chas. E. Townsend.
ATTORNEY April 25, 1944.　　J. G. DORWARD, JR　　2,347,472
AIR VOLUME CONTROL FOR FLUID PRESSURE TANKS
Filed Nov. 16, 1940　　4 Sheets-Sheet 3

INVENTOR.
John G. Dorward, Jr.
BY
Chas. E. Townsend.
ATTORNEY

April 25, 1944.  J. G. DORWARD, JR  2,347,472
AIR VOLUME CONTROL FOR FLUID PRESSURE TANKS
Filed Nov. 16, 1940  4 Sheets-Sheet 4

Inventor
John G. Dorward, Jr.
by: Chas. E. Townsend
Attorney

Patented Apr. 25, 1944

2,347,472

UNITED STATES PATENT OFFICE 2,347,472

AIR VOLUME CONTROL FOR FLUID PRESSURE TANKS

John G. Dorward, Jr., Alameda, Calif.

Application November 16, 1940, Serial No. 365,894

9 Claims. (Cl. 103—6)

This invention relates to means for controlling the liquid level in closed pressure tanks. Such tanks are usually incorporated as a part of fluid pressure systems for maintaining a stored quantity of liquid under pressure.

One object of the present invention is the provision of a simple means for maintaining a substantially constant predetermined liquid level in the fluid pressure tank.

A further object of the invention is the provision of an air supply means to replenish the air absorbed by the liquid in a fluid pressure tank by means of a device incorporating a Venturi aspirator so that air can be injected into the fluid being pumped, by means of a suitable difference in pressure across said Venturi aspirator tube on the discharge side of the pump.

A still further object is the provision of a valve on the discharge side of a liquid pump, the purpose of said valve being to introduce a sufficient pressure difference for the operation of a Venturi aspirator tube without the necessity of tapping the suction or inlet side of said liquid pump.

A still further object of the invention is the provision of means for causing a time delay in the opening of said valve so that a suitable quantity of air will be injected into the liquid each time the liquid pump starts.

A still further object is the provision of means for controlling the time delay in the opening of said valve for the purpose of injecting air into the liquid flowing into the fluid pressure tank only at such times as the liquid level in the pressure tank is above a predetermined level.

A still further object is to provide means for normally maintaining the valve closed and for automatically opening the valve when the pump is started.

A still further object is to provide an adjustable stop to limit opening of the valve so as to maintain a predetermined pressure in the discharge side of the pump.

A still further object is to provide a yielding adjustable stop for the valve to prevent excess pressure from building up in the discharge side of the pump ahead of the valve.

Other objects and advantages of the invention will be made apparent in the specification, in which reference is made to the accompanying drawings.

In the drawings—

Fig. 1 is a side elevation, partially in section, showing a fluid pressure system embodying the present invention;

Fig. 2 is a sectional view showing details of the air aspirator Venturi tube, taken as indicated by arrows 2—2 in Fig. 3;

Fig. 3 is a sectional view of a portion of the discharge connection of the pump removed from its position in Fig. 1, showing a manually controlled discharge valve and an aspirator Venturi tube positioned in the by-pass passage;

Fig. 4 is a section similar to Fig. 3, illustrating an alternative discharge valve embodiment incorporating automatic means for the control of time delay in the opening of the discharge valve, and also an adjustable stop member cooperating therewith;

Fig. 5 is a sectional view through a fluid actuated device mounted within the fluid pressure tank of Fig. 1, shown fragmentarily in section, which provides means for the release of excess air when the liquid level in the pressure tank falls below a predetermined position;

Figure 6:
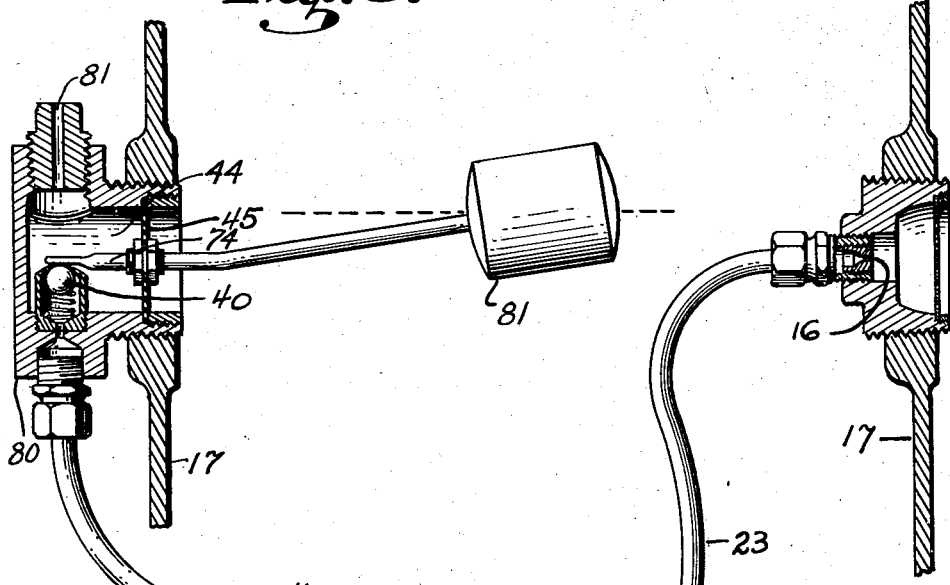
Fig. 6 is a section corresponding to that of Fig. 5 showing a modified form of fluid actuated control device within the fluid pressure tank, showing means for allowing air to enter the Venturi aspirator only when the liquid level in the pressure tank is above a predetermined position, the Venturi section being taken as indicated by line 6—6 of Fig. 4.

Fluid pressure tanks are often used in fluid pressure systems for the purpose of storing a quantity of liquid under pressure by means of a compressed cushion of air above the liquid in said fluid pressure tank. In such systems, it is found that the liquid often absorbs a quantity of the compressed air because of the elevated pressure conditions existing within the fluid pressure tank. Therefore the liquid level in the tank tends to rise because of the absorption of air by the liquid which consequently is carried out of the pressure tank. If the amount of air or other gas over the liquid is small, it is found that the capacity for storage of liquid under pressure in the tank is also small, because of the limited expansion in volume of the small amount of air or gas under the influence of changes in fluid pressure. In all such cases where air is absorbed by the liquid carried away from the tank, it is desirable to provide a means for replenishing the supply of air or gas above the liquid in the pressure tank in order to maintain a comparatively large volume of compressed air in the tank and thus provide for a large storage of liquid under pressure.

In most types of liquid pumps which do not employ a positive displacement principle, it is further desirable not to admit air into the suction or intake side of the liquid pump for the purpose of replenishing the amount of air in the fluid pressure tank. In most pumps such as centrifugal pumps and the like, which are not of a positive displacement action, it is found that air introduced into the liquid at the inlet side of the liquid pump will tend to separate within the pump, due to centrifugal action, and such air will foul the liquid pump and cause reduced output or loss of pumping action entirely. For these reasons this invention does not make use of any means for injecting air into the suction or intake side of the liquid pump, nor is any fluid pressure connection or communication made with the intake side of the liquid pump. Other devices which make use of a fluid pressure connection to the suction or intake side of the liquid pump are subject to the danger of loss of pumping action due to air leaking into the suction side or because of air which is allowed to enter the intake of the liquid pump due to defective construction or operation of the device which communicates with the liquid pump intake.

The method of injecting air into the liquid by means of an air aspirator Venturi tube is well known and is based on one of the oldest laws in hydraulics. In the past, however, such devices have been connected between the liquid pump discharge and intake, and therefore have introduced a mixture of air and liquid into the liquid pump intake, which is highly undesirable for reasons stated above. In the present invention the air is injected into the liquid solely on the discharge side of the pump.

A suitable construction for this aspirator Venturi tube is shown in section in Fig. 2, but many other designs can be used to accomplish the same result. As shown in Fig. 2, liquid from the pump discharge enters the conical converging portion 1, is mixed with air which enters venturi 4 at Venturi throat 2, due to the high velocity and consequent low pressure of the liquid at this point, and the mixture of air and liquid is gradually slowed up, the velocity being converted into pressure in the conical diverging portion 3, for delivery into the fluid pressure tank. A check valve 62 prevents loss of liquid from port opening 10 when insufficient suction exists to draw air into the system.

This invention incorporates the air aspirator of Fig. 2 as an integral part of a valve body 5, as shown in Fig. 3. This aspirator Venturi tube thus forms a by-pass passage across the valve 6, making use of the pressure drop introduced by a closed or partially closed valve. The aspirator will cause the injection of air sufficient to replace that lost by absorption when a portion of the water is by-passed therethrough with sufficient velocity. The term "effective pressure" will be used hereafter to mean that difference in head across the valve which is sufficient to cause entry of air through the Venturi aspirator. This valve is intended for manual operation by means of a handwheel 8, shown in Fig. 3.

Fluid pressure systems which incorporate a liquid actuated ejector in combination with a liquid pressure pump, as shown in Fig. 1, require as a necessary part a suitable adjustable valve, such as indicated at 6 at the discharge outlet to provide sufficient liquid pressure at the pump discharge at all times. This liquid pressure must be maintained above a minimum value to insure operation of the ejector unit 50; therefore the valve is a necessary part of such fluid pressure systems and the use of this invention fulfills this requirement.

Such an automatic water system of the ejector type, consists, in general, of a pump 51, with an appropriate driving motor 52, controlled by a pressure actuated switch 54 connected through a tube 68 to outlet passage 12 of discharge member or valve body 5. The pump has a suction line 55, which may vary in structure with the condition of operation and the type of pump used. The structure illustrated employs a centrifugal type pump, and the suction line is provided with a jet pump booster in the form of a venturi 56, through which water is forced under high pressure by nozzle 50. During pumping, the water is diverted through a tube 59 to the nozzle 50 by pressure control valve 6, shown in detail in Fig. 3. The lowered pressure at venturi 56, due to the high velocity of the jet formed by nozzle 50, serves to draw water through a foot valve 60 and into the venturi 56. The velocity energy of the mixed stream in the throat of venturi 56 is converted into pressure by an expanding diffuser 61, and this pressure forces the water to within suction distance of the centrifugal pump 51. The foot valve 60 permits passage of liquid in one direction only and thus serves to prevent back flow of water out of the system when pump 51 is stopped.

The switch mechanism 54 and its connection 68 to discharge line 12 are conventional and no claim will be directed thereto. The foot valve 60 is purely conventional and forms no part of the present invention.

Fig. 4 illustrates an alternative embodiment to that shown in Fig. 3 of structure within valve body 5, member 61 being interchangeable with the hand control valve 9 of that figure, comprising means for causing a time delay in the opening of the valve which allows sufficient air to be injected at 10 before the valve sleeve 6' opens sufficiently to reduce the pressure drop between passages 11 and 12. Operation of the valve is as follows: Valve sleeve 6' is normally held closed by a spring 22. Passage 11 communicates with the liquid pump discharge and when the pump starts a liquid pressure is developed between passages 11 and 12. This pressure causes a high velocity flow through the venturi 4, and exerts a force on the valve sleeve 6' and stem 13. This force is resisted by a quantity of liquid trapped in a variable size chamber 14, which is formed by displacement diaphragm 15 and a housing 61 secured to valve body. The trapped liquid must flow through a tube 23 and a restricted orifice 16 and into tank 17 before movement of the valve stem is possible. This restricted flow of liquid causes slow opening of the valve sleeve 6', a considerable movement of which is necessary before the opening of the valve ports 18. Ultimate opening of the valve is determined by an adjustable stop 19 which is sealed against fluid leakage from the chamber 14 by a gasket 20. When operation of the liquid pump stops, pressure is equalized between the passages 11 and 12 through the venturi 4 and the valve and stem are returned to their initial position by a spring 22. Closing of the valve 6' causes a reverse flow of liquid between tank 17 and chamber 14, through the orifice 16. Although a flexible diaphragm displacement member is shown at 15, any other suitable displacement member such as a piston or bellows could be incorporated without changing the scope of the invention.

It should be noted that the orifice 16 is placed in the side wall of the fluid pressure tank 17, which orifice communicates with the chamber 14 by means of tube connection 23. As long as the liquid level in the tank is above the orifice 16, liquid is forced through the orifice and slow opening of the valve is provided thereby, thus allowing air intake at 10, when the pump starts. When the liquid level in the tank drops below the orifice 16, the air or gas from the tank is taken through the orifice 16, and the tube 23, into the chamber 14 by action of the spring 22, and the displacement member 15. When the liquid pump starts, the orifice 16 offers little resistance to flow of air or gas into the tank, resulting in fast operation of the valve stem 13 and consequently little or no intake of air at 10. This operation serves to maintain the tank liquid level at the orifice 16, when the liquid pump is stopped at a definite tank pressure.

Automatic regulation of a minimum pressure at the pump discharge is highly desirable in fluid pressure systems incorporating an ejector. First of all, the ejector shown at 50 in Fig. 1 will not operate to advantage below a minimum pressure, for instance, a pressure which in practice has been established as around twenty pounds. Hence, means such as the adjustable stop 19 is provided for maintaining the discharge valve in a position where the minimum pressure is maintained during pump operation.

Again, it is possible that flow will be restricted, causing too great a pressure to be built up in the discharge side of the pump or the passage 11 by foreign matter lodging between the discharge valve sleeve 6' and its seat 69 when the valve is partially open; if that should happen, it would be desirable to provide automatically actuated means which would permit further opening of the valve so as to free or dislodge the foreign matter and at the same time relieve the excess pressure, and then automatically to return the valve to maintain the pressure differential desired.

Figure 7:
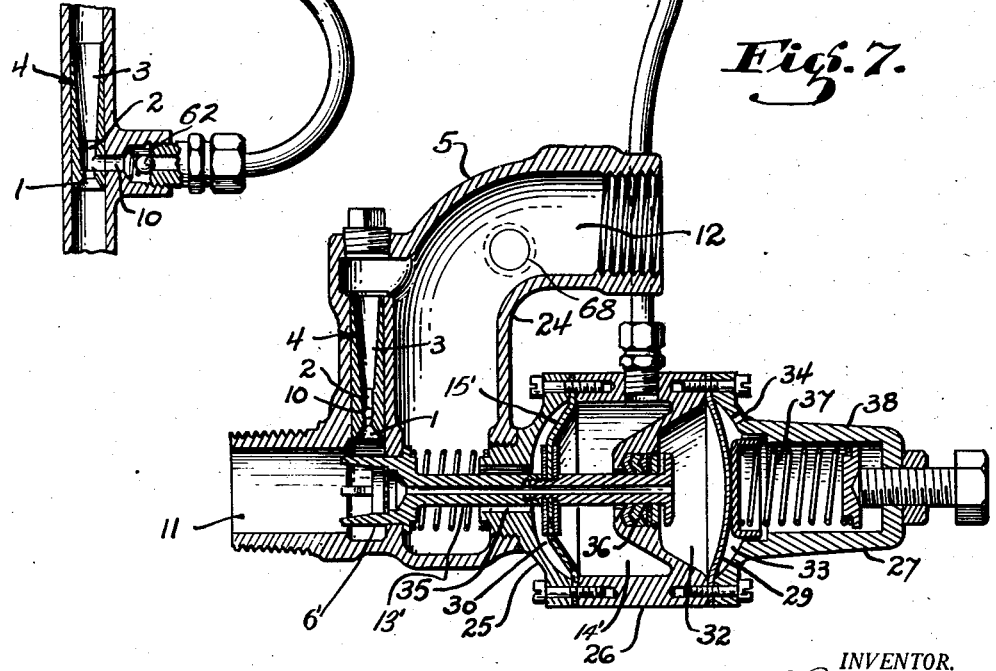
Fig. 7 is a view of another modified form of discharge connection having means for automatically relieving excess pressure in the discharge side of the pump and for freeing foreign matter that may be lodged between the discharge valve and its seat.

In the structure shown in Fig. 7, the valve control 9 of Fig. 3 is replaced by a unit having three housing sections 25, 26 and 27, and two flexible diaphragms 15' and 29. These diaphragms form the several chambers indicated at 30, 14', 32 and 33. The chamber 14' communicates with the tank 17 through the pipe 23 and the orifice member 16; the chamber 33 with the atmosphere through the vent opening 34; the chamber 32 with the passage 11 through the hollow valve stem 13' as shown; and the chamber 30 with the passage 12 through the opening 35. In actual operation, let it be assumed that the amount of air in the tank has been reduced to such an extent that the water level stands above the discharge orifice 16. If such is the case, the chamber 14' will be filled with water, and if the pump is started, the discharge valve will be opened by delay action. That is, the moment the pump starts, a comparatively high pressure will be built up in the passage 11 and water will then discharge through the Venturi member 4, thus causing an inflow of air which will enter the tank with the water. The pressure, whatever it may be, in the passage 11 will simultaneously act on the valve and this, together with the stem, will move in a right-hand direction, causing the valve slowly to open, the water in the chamber 14' being at the same time discharged through the orifice 16 into the tank. It is the size of the orifice together with the effective area of the diaphragm 15' and the length of the stroke of valve stem 13', that determines the time period of the delay action. The inner end of the valve stem passes through a stuffing box or packing such as shown at 36, and leakage from chamber 14' to 32 is thus substantially avoided. The head member formed on the inner end of the valve stem will engage the diaphragm 29 and, as this is counteracted by a cap 37 and an adjustable spring 38, said cap and spring will function as a stop member and finally limit the opening movement of the discharge valve, the position that the valve finally assumes when stopped being that at which a minimum pressure will be maintained in the discharge passage 11 during operation of the pump.

Now, if foreign matter or the like should happen to lodge between the valve and its seat, the pressure at 11 would obviously increase and might become excessive, thus interfering with the discharge of water or liquid, and at the same time, materially reduce the efficiency of the pump. If that should happen, the pressure exerted against the valve will be slightly increased and the pressure in the chamber 32 would be materially increased; thus the pressure against the cap would be increased and the spring 38 would yield, thus permitting further opening of the valve. This would relieve the excess pressure at 11, and under any condition would permit freeing or dislodging of foreign matter and the moment the pressure is reduced and the foreign matter dislodged the pressure obviously drops, thus permitting the spring 38 to return the valve to the normal or desired open position where a minimum pressure will be maintained.

In the simplest form of the invention, shown in Fig. 3, the operation is manual entirely. That is, the valve is adjusted by the hand wheel 9 until it assumes a position where a minimum pressure will be maintained in the discharge passage 11.

In the structure shown in Fig. 4, the valve is automatically opened when the pump is started, and its open position is controlled by the adjustable stop screw 19. Also in this structure delay action is obtained through the action of the diaphragm 15, the pipe 23, and the discharge orifice 16, and the valve is normally closed when the pump is stopped by the spring 22.

All of the latter features are also obtained in the structure shown in Fig. 7, and in addition thereto the diaphragm 29 and the cooperating cap and spring 38 are provided, to function as an automatic adjustable stop; that is, a stop that will yield in the event that excess pressures are built up on the discharge side or passage 11 of the pump, and which will also function to return the valve to normal open position when the foreign matter has been freed or dislodged.

In some instances, it is possible that an excess quantity of air might be introduced into the tank 17, and under such circumstances it would be desirable either to control the amount of air admitted or to release excess air.

An excess air release valve unit 70 designed for such use is shown in Fig. 5. The unit 70 includes a housing member 71, secured threadably or by equivalent means to the wall of tank 17 at about the normal liquid level. A ball valve 72 is mounted within housing member 71 and communicates with the outside air through a port 74. Valve 72 is held closed normally by pressure thereon of a lever 75 pivoted at 76 in the valve unit 70 and carrying at its opposite end a float 42. When the liquid level is too low, float 42 drops, releasing ball valve 72, which then opens and permits release of excess tank air through port 74. An alternative air control device is shown in Fig. 6 which is effective when too little air is present in the tank 17. Fig. 6 shows control of air intake into the venturi 4 by means of a float actuated air inlet valve in the tank which communicates with the air inlet check valve 40 by means of a tube connection 41.

Valve 40 is mounted in a housing 80 threadably inserted in wall 17 of the tank at about average liquid level, but is sealed from the tank by a flexible diaphragm 45. Diaphragm 45 acts as a pivotal support for a lever 74 attached at its inner end to a float 42, and engaging a check valve 40 at its outer end. Air may enter freely into the chamber space 44 in housing 80 defined by diaphragm 45 through an inlet port 81, but its egress is blocked by valve 40 unless there is too little air or too much liquid in tank 17. When float 81 is thus raised above its normal position, lever 74 depresses and opens valve 40, permitting a free supply of air through housing 80 and tube 41 to the venturi 4, which then functions as above to mix the air with the water and replace the deficiency. Ball valve 72 is constrained to open by a spring 82 when released by dropping of float 42.

Figure 8:
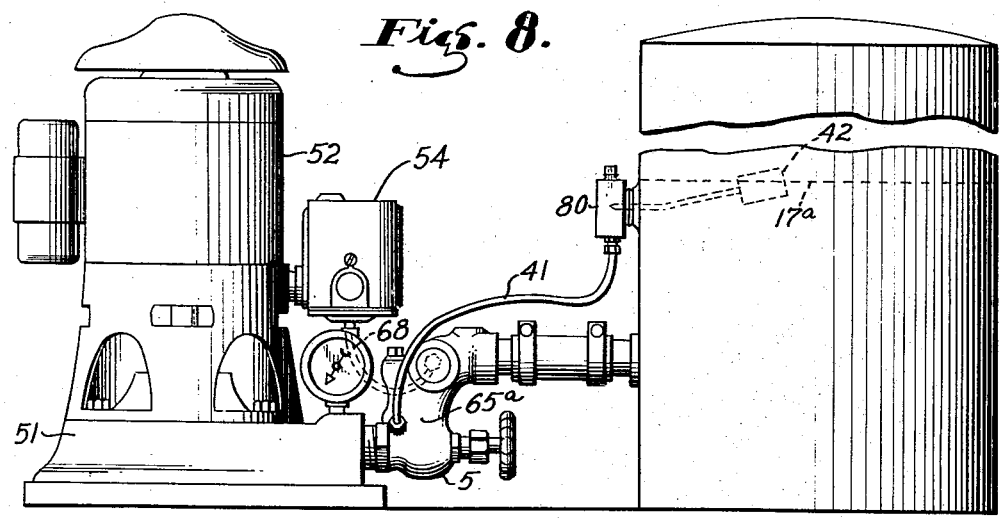
Fig. 8 is an assembly view, in elevation, showing the float actuated air valve of Fig. 6 connected to by-pass venturi of Fig. 1.

Fig. 8 is an assembly view, showing both the by-passing of the discharge line and the air inlet control for the air injector. In this figure the water level in the tank 17 is indicated at 17ª. The structure, illustrated in Fig. 6 and generally indicated at 80 in Fig. 8, is attached to the tank, with the tubing 41 connected to the valve body 5 at 65ª.

The operation is as last above described.

While this and other features of my invention have been more or less specifically described for purposes of illustration, it is to be understood that various changes may be resorted to, all within the scope of the appended claims.

Having thus described my invention, what I claim and desire to secure by Letters Patent is:

1. In a fluid pressure system embodying a fluid storage tank and a discharge line, a pump for supplying a liquid under pressure to the tank, said pump having an inlet and a discharge connection, a by-pass on the discharge side of the pump and in communication with the tank, a valve normally closing the discharge outlet of the pump, means for setting up a differential pressure sufficient to create a temporary flow through the by-pass of sufficient velocity to aspirate air, whenever said pump is started, an aspirator mounted in the by-pass and actuated by liquid flow therethrough for introducing a gas into the tank, and means actuated by the level of the liquid in the tank for effecting the delay-action in the opening of the valve.

2. In a fluid pressure system embodying a fluid storage tank and a discharge line, a pump for supplying a liquid under pressure to the tank, said pump having an inlet and a discharge connection, a by-pass on the discharge side of the pump and in communication with the tank, a valve normally closing the discharge outlet of the pump, delay action means actuated by liquid pressure produced when the pump is started for opening the valve, said valve and delay action means causing temporary flow of liquid under effective pressure through the by-pass, means actuated by the liquid flow through the by-pass for introducing a gas into the tank, and means actuated by the level of the liquid in the tank for effecting the delay-action in the opening of the valve.

3. In a fluid pressure system embodying a fluid storage tank and a discharge line, a pump for supplying a liquid under pressure to the tank, said pump having an inlet and a discharge connection, a by-pass on the discharge side of the pump and in communication with the tank, a valve normally closing the discharge outlet of the pump, delay action means actuated by liquid pressure produced when the pump is started for opening the valve, said valve and delay action means causing temporary flow of liquid under effective pressure through the by-pass, means actuated by the liquid flow through the by-pass for introducing a gas into the tank, an adjustable stop member controlling the open position of the valve, and means actuated by the pressure in the tank to relieve excess pressure in the pump discharge.

4. In a fluid pressure system embodying a fluid storage tank and a discharge line, a pump for supplying a liquid under pressure to the tank, said pump having an inlet and a discharge connection, a by-pass on the discharge side of the pump and in communication with the tank, a valve normally closing the discharge outlet of the pump, delay action means actuated by liquid pressure produced when the pump is started for opening the valve, said valve and delay action means causing temporary flow of liquid under effective pressure through the by-pass, means actuated by the liquid flow through the by-pass for introducing a gas into the tank, an adjustable stop member controlling the open position of the valve, and means actuated by the building up of excess pressure in the discharge of the pump for moving the adjustable stop to cause further opening of the valve to relieve the excess pressure and to free foreign matter which may have obstructed the flow of liquid past the valve.

5. In a fluid pressure system embodying a fluid storage tank and a discharge line, a pump for supplying a liquid under pressure to the tank, said pump having an inlet and a discharge connection, a by-pass on the discharge side of the pump and in communication with the tank, a valve normally closing the discharge outlet of the pump, delay action means actuated by liquid pressure produced when the pump is started for opening the valve, said valve and delay action means causing temporary flow of liquid under effective pressure through the by-pass, means actuated by the liquid flow through the by-pass for introducing a gas into the tank, an adjustable stop member controlling the open position of the valve, means actuated by the building up of excess pressure in the discharge of the pump for moving the adjustable stop to cause further opening of the valve to relieve the excess pressure and to free foreign matter which may have obstructed the flow of liquid past the valve, and other means for returning the adjustable stop and the valve to a position controlled by the adjustable stop when excess pressure has been relieved.

6. In a fluid pressure system embodying a fluid storage tank and a discharge line, a pump for supplying a liquid under pressure to the tank, said pump having an inlet and a discharge connection, a by-pass on the discharge side of the pump and in communication with the tank, a valve normally closing the discharge outlet of the pump, delay action means actuated by liquid pressure produced when the pump is started for opening the valve, said valve and delay action means causing temporary flow of liquid under effective pressure through the by-pass, means actuated by the liquid flow through the by-pass for introducing a gas into the tank, and means actuated by the liquid level in the tank for varying the time of the delay action.

7. In a fluid pressure system embodying a fluid storage tank and a pump for supplying a liquid under pressure to the tank, a discharge connection leading from the pump to the tank, a by-pass in the discharge connection, a valve for directing the liquid from the pump through the by-pass under effective pressure, means actuated by the liquid flow through the by-pass for introducing a gas into the tank, said valve adapted to be opened by pressure exerted on it by the liquid under pressure discharging from the pump, a housing adjacent to the valve, a diaphragm in said housing dividing the housing into two chambers, means connecting the valve to the diaphragm, a connection for supplying fluid under pressure to one chamber, and a restricted orifice member in said connection to retard opening of the valve when acted upon by liquid under pressure from the pump so that liquid under effective pressure from the pump will flow through the by-pass for a predetermined period of time before the valve is opened.

8. In a fluid pressure system embodying a fluid storage tank and a discharge line, a pump for supplying a liquid under pressure to the tank, said pump having an inlet and a discharge connection, a by-pass on the discharge side of the pump and in communication with the tank, a valve normally closing the discharge outlet of the pump, delay action means for operating the valve comprising a stem for the valve, means enclosing a fluid pressure chamber having a flexible diaphragm operated by the variations in pressure, said stem connected with the diaphragm and operated thereby to open and close the valve, connections between the tank and pressure chamber, whereby the variations in pressure in the tank are transmitted to the pressure chamber, and means actuated by the pressure in the pressure chamber for controlling the gas flow to the by-pass.

9. In a fluid pressure system, the combination with a pressure tank of valve control mechanism for controlling the admission of liquid and air to the tank including a valve casing having an inlet and an outlet, the latter connected with the tank, a valve to control said outlet, said valve having a valve stem, means enclosing a chamber into which said valve stem extends, a flexible diaphragm connected to the valve stem and forming one wall of said chamber, and a fluid connection between said chamber and the tank, whereby variations of pressure in the tank act through the diaphragm to open or close said valve, said fluid connection with the tank having a restricted opening, whereby, when the opening of said fluid connection into the tank is above the liquid level in the tank, the movement of the valve is relatively slow as compared with the movement of the valve when the said opening is below the level of the liquid in the tank.

JOHN G. DORWARD, Jr.